Sept. 20, 1960 F. J. SOMES, JR 2,953,342
ELECTRICAL DISTRIBUTION SYSTEM
Original Filed March 5, 1957 3 Sheets-Sheet 2
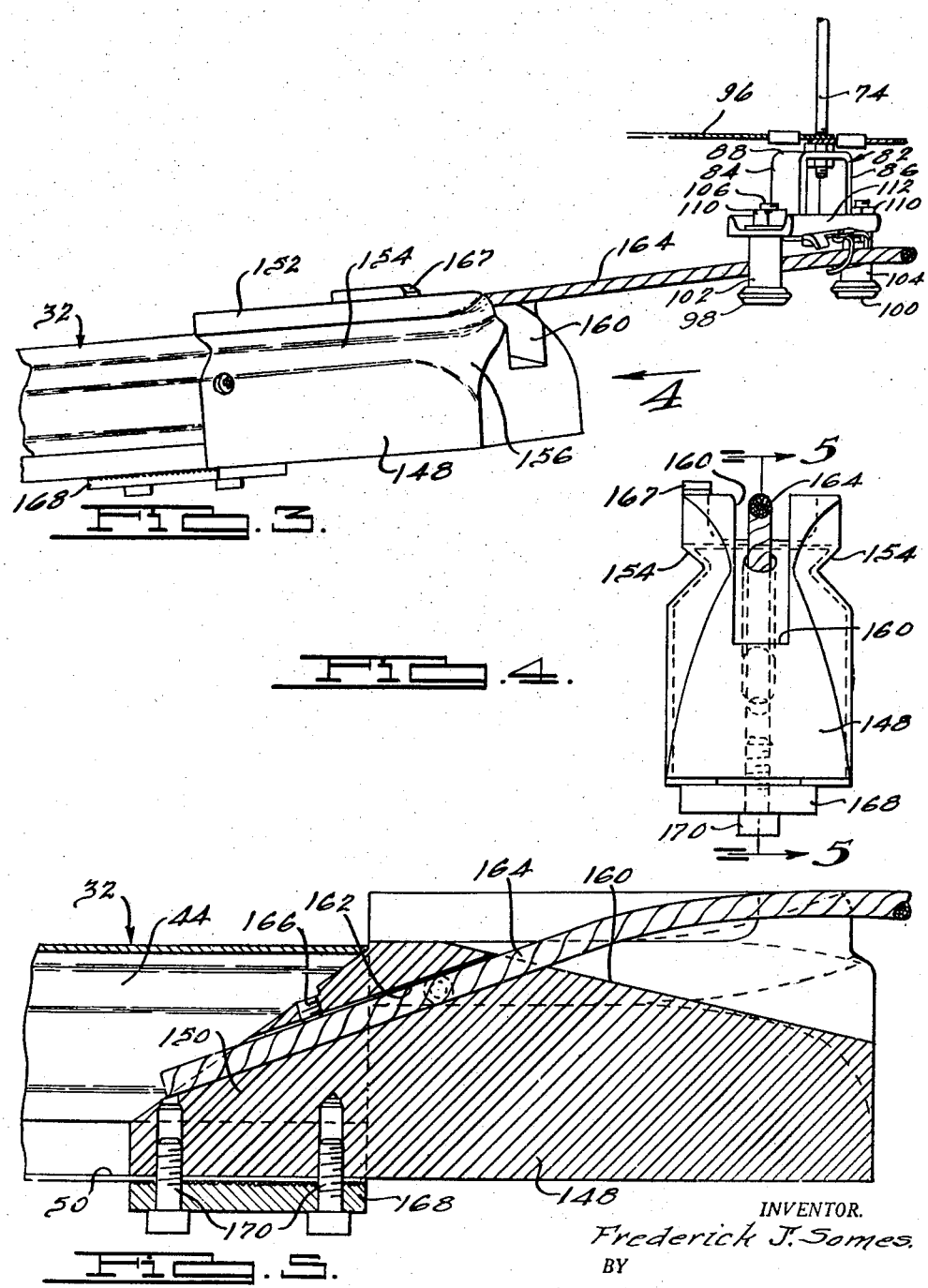
INVENTOR.
Frederick J. Somes.
BY
Harness, Dickey & Pierce
ATTORNEYS.

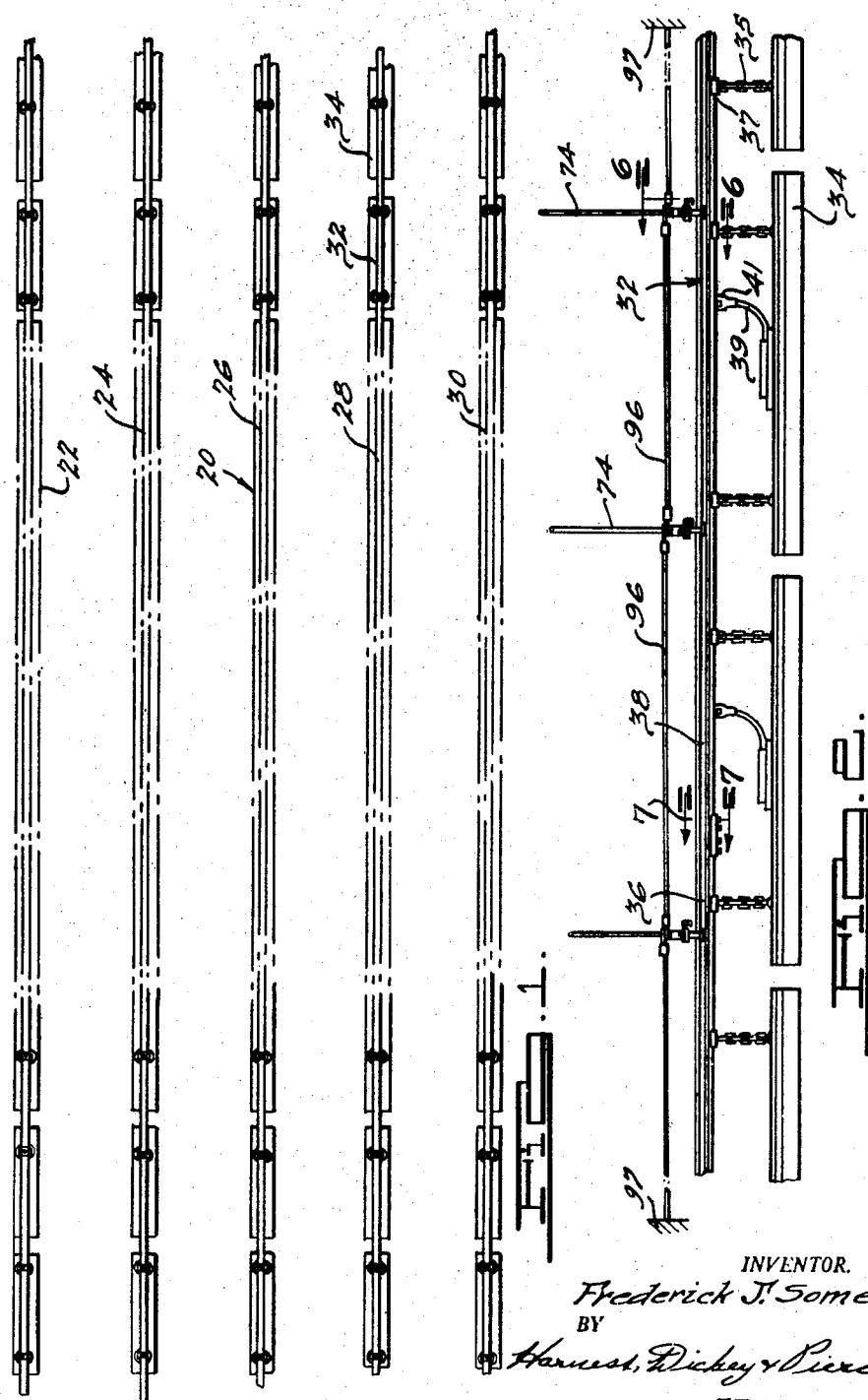

Sept. 20, 1960 F. J. SOMES, JR 2,953,342
ELECTRICAL DISTRIBUTION SYSTEM
Original Filed March 5, 1957 3 Sheets-Sheet 3
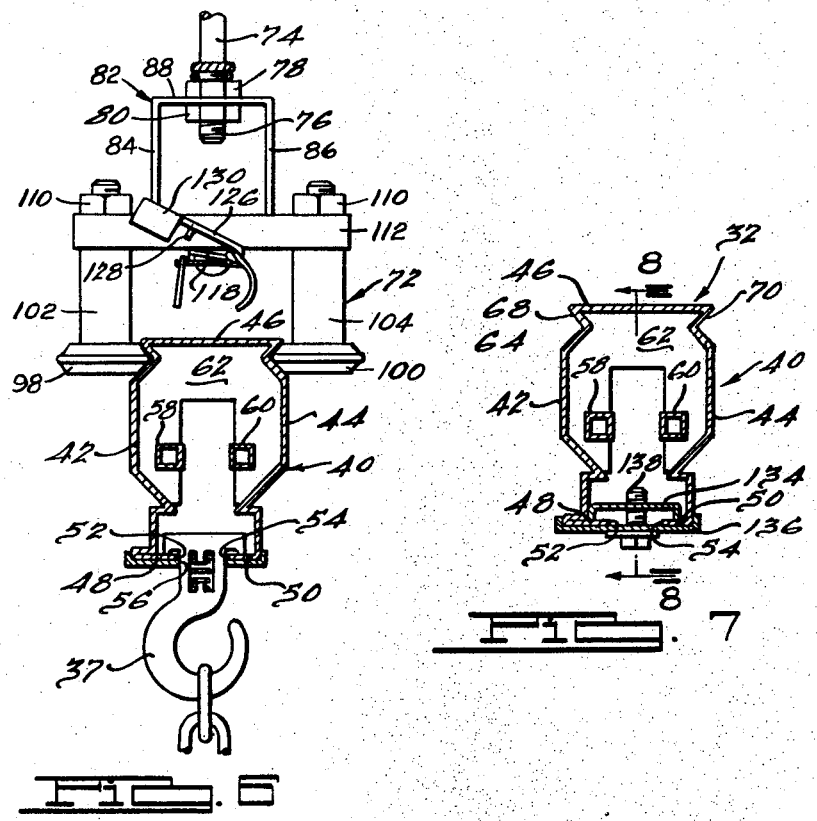
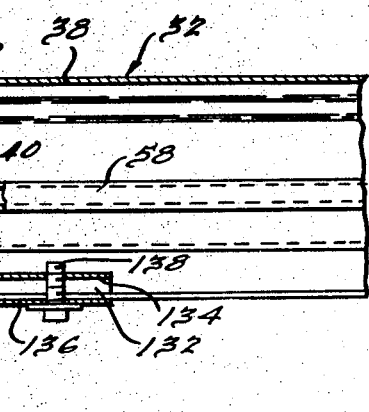
INVENTOR.
Frederick J. Somes,
BY
Harness, Dickey & Pierce
ATTORNEYS.

2,953,342

Patented Sept. 20, 1960

2,953,342

ELECTRICAL DISTRIBUTION SYSTEM

Frederick J. Somes, Jr., Detroit, Mich., assignor to General Electric Company, a corporation of New York Original application Mar. 5, 1957, Ser. No. 643,977, now Patent No. 2,931,097, dated Apr. 5, 1960. Divided and this application Oct. 2, 1957, Ser. No. 687,756

2 Claims. (Cl. 248—317)

This invention relates to electrical power distribution systems and apparatus for installing the same. More particularly, the invention relates to improved apparatus for supporting an electrical power distrubtion system during and after the installation thereof, particularly adapted for large scale installations such as industrial plants. This application is a division of the applicant's co-pending application, Serial No. 643,977, filed March 5, 1957, now Patent No. 2,931,097, and is related to co-pending application Serial No. 540,230, filed October 13, 1955, now abandoned, by the present applicant.

An object of the invention is to provide improved apparatus for supporting the components of an electrical power distribution system during and after the installation thereof.

Another object of the invention is to provide an improved electrical power distribution system incorporating novel means which reduces to a minimum the time, labor and expense required to install and maintain the system.

It is a further object to provide an improved power distribution system of this character, and method for installing the same, which will minimize or eliminate undesired deflection of the parts both during and after installation, thus facilitating the assembly operation and resulting in a sturdy installation capable of withstanding heavy use.

The above as well as other objects and advantages of the present invention will become apparent from the following description, the appended claims, and the accompanying drawings, wherein:

Figure 1 is a top plan view of electrical power distribution apparatus embodying the present invention, showing the same installed in an electrical power distribution system;

Figure 2 is an enlarged side elevational view of a portion of the structure illustrated in Figure 1;

Figure 3 is a perspective view of apparatus embodying the present invention, showing the same during an installation with the guide block about to enter the supporting rollers;

Figure 4 is an end view of the guide block and attached cable;

Figure 5 is a longitudinal sectional view of the structure illustrated in Figure 4, taken on the line 5—5 thereof and showing the manner of attaching the cable to the guide block;

Figure 6 is a transverse sectional view of a portion of the structure illustrated in Figure 2, taken on the line 6—6 thereof, showing the cable guide in released position;

Figure 7 is a transverse sectional view of a portion of the structure illustrated in Figure 2, taken on the line 7—7 thereof and showing the construction of the trolley duct;

Figure 8 is a sectional elevational view of the structure illustrated in Figure 7, taken on the line 8—8 and showing the duct connector.

In general, the improved method of installing the electrical power distribution apparatus includes the steps of electrically and mechanically joining two initially separate sections of a trolley duct in end-to-end relationship to form an elongated unitary structure, the sections being joined at a particular location, such as at one end of a proposed busway; moving the joined sections a predetermined distance along a predetermined path; suspending the joined sections at predetermined spaced intervals; restraining the suspending means against movement in a direction substantially parallel to the direction of the proposed busway; and thereafter successively electrically and mechanically joining additional sections in end-to-end relationship with respect to the previously joined sections, moving the joined sections a predetermined additional distance after each new section is added, and suspending the joined sections at additional spaced intervals until all of the desired sections have been electrically and mechanically connected and moved to the desired location.

The apparatus of the present invention incorporates improved means which facilitate the rapid installation of a relatively large electrical power distribution system with a minimum of equipment, labor and expense. The apparatus also incorporates improved means which materially increases the efficiency of the workmen installing the system, thereby increasing the work output rate of the workmen and reducing the cost of the system.

Referring to the drawings, and more particularly to Figure 1 thereof, an electrical power distribution system, generally designated 20, is illustrated which is comprised of a plurality of spaced, substantially parallel rows 22, 24, 26, 28 and 30 of trolley ducts 32 which are adapted to supply electrical power to lighting fixtures 34 or other desired electrical equipment. In the illustrated embodiment of the invention, fixtures 34 are shown in Figure 2 as being suspended by chains 35 which are secured to trolley ducts 32 by hooks 37, the fixtures being electrically connected to trolley ducts 32 by conduits 39 and conventional plugs or trolleys 41. While multiple trolley ducts 32 are illustrated, it will be understood that the present invention may be utilized in the installation of only one trolley duct, if desired. Each of the rows of trolley ducts may, for example, extend for several hundred feet, the electrical power distribution system 20 illustrated being particularly adapted for factories or other relatively large buildings.

In the embodiment of the invention illustrated, each of the trolley ducts 32 includes a plurality of sections, such as 36 and 38 shown in Figure 8, which are electrically and mechanically joined together in end-to-end relationship to form a unitary structure. The individual sections may be of any desired or conventional length; for example, each section may be approximately ten feet in length.

As shown in Figures 6 and 7, each section of trolley duct 32 includes a housing generally indicated at 40 having spaced side walls 42 and 44 joined by a top wall 46. The lower end portions of the side walls, as viewed in Figures 6 and 7, are provided with inwardly extending flanges 48 and 50, the inner edges 52 and 54 of which terminate in spaced substantially parallel relationship to define an elongated slot 56. Flanges 48 and 50 serve as tracks which extend along housing 40 and upon which conventional trolleys, plugs or other connectors such as conduits 39 of Figure 2 are mounted in a conventional manner.

Housing 40 encloses electrical conductors 58 and 60 disposed in spaced relationship with respect to walls 42, 44 and 46 of the housing. The conductors are also disposed in inwardly spaced relationship with respect to the flanges 48 and 50, electrical insulators 62 being provided at spaced intervals to support conductors 58 and 60 and electrically insulate the conductors from the housing. At a position adjacent top wall 46, the side walls are provided with generally V-sectioned longitudinally extending inclined sections which form grooves 68 and 70 extending longitudinally of the housing 40 for the entire length thereof. These grooves are adapted to engage the supporting assemblies as will be described below in greater detail.

In order to support the ducts, a plurality of spaced supporting assemblies generally indicated at 72 in Figure 6 and having vertically extending suspension rods 74 are provided, the upper end portions of these rods being fixed to the roof trusses or other appropriate supporting structures of the building. Any desired or conventional means, such as clamps, may be employed to fix the upper end portions of the rods to the roof trusses. The lower end portions of the rods are threaded, for the reception of nuts 78 and 80. A plurality of brackets 82 are provided, each having a pair of depending legs or side portions 84 and 86 integrally joined by a web portion 88, the free ends of the side portions 84 and 86 being provided with outwardly projecting flanges. The lower end portion of each rod 74 projects through an aperture 94 in the web portion of the associated bracket and the web portion is retained on the rod 74 by nuts 78 and 80. Although fixed with respect to rod 74, the nuts are not tightened against the web portion with the result that the bracket is permitted to rotate about the longitudinal axis of the associated rod. This will permit the bracket and its associated parts to adjust themselves to the entering duct, as described later.

In order to maintain the positions of suspension rods 74 when the duct housing is being installed, a plurality of tension wires 96 extend between adjacent rods, as seen best in Figure 2. These wires are secured to the rods at the lower ends thereof, and the first and last wires in a row will be secured to adjacent portions 97 of the stationary structure. Any tendency of rods 74 to sway in the direction of movement of the duct bars as they are being installed will be resisted by the combined effect of wires 96, thus facilitating the installation process.

For the purpose of supporting the duct housing, a pair of spaced rollers 98 and 100 are suspended from each bracket 82. In particular, rollers 98 and 100 are rotatably mounted on vertical stub shafts 102 and 104 respectively as seen in Figure 3, these shafts having reduced and threaded upper ends 106 and 108 projecting through bracket flanges 90 and 92 and secured to these flanges by nuts 110. A channel-shaped cross member 112 is secured between the shouldered portions of shafts 102 and 104 and flanges 90 and 92. Anti-friction bearings are provided at the lower ends of shafts 102 and 104 for rotatably supporting rollers 98 and 100. The supporting elements are each provided with beveled surfaces adapted to project into the longitudinally extending grooves 68 and 70 provided on the duct housing, thus providing a firm support which prevents transverse rocking of the housing but permits it to glide longitudinally.

Referring to Figure 3, a guide block 148 is provided which is adapted to be secured to the free end of the leading section of the trolley duct to facilitate the installation thereof. The guide block includes a body portion having an extension 150 projecting outwardly and rearwardly from the lower edge thereof, as seen in Figure 5, and a head portion 152 which is joined to and narrower than the body. Between the head portion and the body portion, a pair of guideways 154 are provided. Each of the guideways includes a converging section 156 at the forward end and a substantially straight section, the straight sections being of substantially the same configuration as grooves 68 and 70 in housing 40. An upwardly open slot 160 is also provided in the head portion of the guide block, the slot sloping upwardly and rearwardly and communicating with a diagonally downwardly extending aperture 162 defined by the body portion, as seen in Figure 5. Aperture 162 is adapted to receive a cable 164 and a plurality of set screws 166 are provided to releasably secure the cable to the guide block, so that the guide block and the attached trolley duct may be pulled through the agency of the cable and the cable disassembled from the guide block when a trolley duct has been completed. A cam 167 having an upwardly and rearwardly sloping surface is fixed to the top of guide block 148 for engagement with tab 130 of guide clamp 126, so that guide 116 may be automatically released as described below.

In securing guide block 148 to the free end of the leaving section of a trolley duct 32, extension 150 of the guide block is inserted intermediate the side walls 42 and 44 of the housing, as seen in Figures 5 and 6, so that the bottom wall of the extension engages the inner surfaces of the flange portions 48 and 50 of the housing. Flanges 48 and 50 are clamped between extension 150 of the guide block and a retaining plate 168 having a serrated surface which engages the outer surfaces of the flange portions 48 and 50 of the housing. Screws 170 are provided which extend through retaining element 168 and threadably engage extension 150 of the guide block to clamp the guide block to the trolley duct. When the guide block is mounted on the trolley duct, guideways 154 on the guide block are aligned with grooves 68 and 70 of the trolley duct, the upper surfaces of the guideways being substantially coplanar with grooves 68 and 70 in constituting a continuation thereof.

In the installation of the electrical power system, supporting assemblies 72 are suspended from a roof truss or other suitable stationary supporting structure at spaced intervals and in aligned relationship along the proposed rows of trolley ducts, the supporting assemblies being suspended from the roof truss, for example, by suspension rods 74 in such manner that they are free to rotate about the rod axes.

Guide block 148 is secured to the leading end of the first section of the trolley duct in the manner previously described, after which the trailing end of the first section is mechanically and electrically connected to the second section in end-to-end relationship. Succeeding sections of the duct are joined through pins 140 and connectors 132. The individual sections of trolley duct are preferably joined at one location, such as at one end of each proposed row of duct, thereby obviating the necessity of the workman moving from such location during the assembly of the duct.

After the first and second sections have been secured together in end-to-end relationship, such sections are pulled toward the nearest supporting assembly 72 by cable 164. As the guide block approaches the first supporting assembly, guide 116 on the first support member tends to raise the guide block toward rollers 98 and 100 and, at the same time, connector 142 tends to compensate for the deflection of the unsupported first section of the trolley duct. It will be appreciated that with an elongated section of trolley duct, the end being pulled by the cable will tend to sag downwardly away from the supporting assembly, and guide 116 as well as connector 142 will serve to guide the guide block toward the rollers.

Converging portions 156 of grooves 154 initially engage rollers 98 and 100. As the guide block moves through the rollers, grooves 154 on the guide block will align grooves 68 and 70 of the housing with the rollers, and the latter will thus glidably support the initially joined sections of the trolley duct. During this movement, cam 167 will engage tab 130, lifting clamp 126 and permitting the end portions of guide spring 118 to spread apart so that the end of cable 164 which is fastened to guide block 148 may pass through. The position of cam 167 is such that when cable 164 is released rollers 98 and 100 will be supporting guide block 148. The pivotal connection between bracket 82 and suspension rod 74 will permit the rollers to adjust themselves to receive the guide block, and tension wires 96 will prevent any tendency of rods 74 to sway in the direction of movement of the duct housing.

The remaining sections of the trolley duct are then successively electrically and mechanically joined to the previously joined sections, the mechanical connections being effected through the agency of connectors 132, and the joined sections are pulled by the cable through the supporting assemblies. The guide block thus effects the initial engagement with the rollers of each supporting assembly and serves to align the duct grooves with the rollers.

After all the sections of a trolley duct have been joined together and pulled into engagement with the supporting assemblies, the cable and guide block may be removed and reused. Conductors 58 and 60 may, of course, be electrically connected to a suitable source of potential in any desired manner. Light fixtures 34 or other electrical equipment may be installed during the assembly of the trolley duct or may be installed after the trolley duct is in its final position.

While it will be apparent that the preferred embodiments of the invention disclosed are well calculated to fulfill the objects above stated, it will be appreciated that the invention is susceptible to modification, variation and change without departing from the proper scope or fair meaning of the subjoined claims.

What is claimed is:

1. In a system for installing a plurality of aligned duct sections for electrical distribution, a row of supporting assemblies, each assembly comprising a vertically extending suspension rod adapted to be secured to an overhead stationary support, a bracket secured to the lower end of said rod, and a pair of duct-supporting rollers rotatably mounted on said bracket, and tension means connecting adjacent suspension rods, additional tension wires secured to the first and last rods of said row, and stationary supports for holding said first and last wires under tension, whereby movement of said rods in the direction of movement of said duct sections during installation of said duct sections will be resisted.

2. In a system for installing a plurality of aligned duct sections for electrical distribution, a row of supporting assemblies, each assembly comprising a vertically extending suspension rod adapted to be secured to an overhead stationary support, a bracket secured to the lower end of said rod, said bracket including means for slidably receiving said duct sections, a plurality of tension wires connecting adjacent suspension rods, additional tension wires secured to the first and last rods of said row, and stationary supports for holding said first and last wires under tension, whereby movement of said rods in the direction of movement of said duct sections during installation of said duct sections will be resisted.

References Cited in the file of this patent

UNITED STATES PATENTS

| | | |
|---|---|---|
| 1,291,079 | Morris | Jan. 14, 1919 |
| 1,531,075 | Clubine | Mar. 24, 1925 |
| 1,727,547 | Knoll | Sept. 10, 1929 |
| 2,291,492 | Naysmith | July 28, 1942 |
| 2,626,301 | Hammerly | Jan. 20, 1953 |
| 2,708,686 | Bernard | May 17, 1955 |